US012357986B2

(12) United States Patent
Podbiel

(10) Patent No.: US 12,357,986 B2
(45) Date of Patent: Jul. 15, 2025

(54) MICROFLUIDIC DEVICE, METHOD FOR PRODUCING SAME, AND USE THEREOF

(71) Applicant: Robert Bosch GmbH, Stuttgart (DE)

(72) Inventor: Daniel Sebastian Podbiel, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1113 days.

(21) Appl. No.: 16/973,763

(22) PCT Filed: Jun. 18, 2019

(86) PCT No.: PCT/EP2019/065986

§ 371 (c)(1),
(2) Date: Dec. 9, 2020

(87) PCT Pub. No.: WO2019/243311

PCT Pub. Date: Dec. 26, 2019

(65) Prior Publication Data

US 2021/0252506 A1 Aug. 19, 2021

(30) Foreign Application Priority Data

Jun. 21, 2018 (DE) ..................... 10 2018 210 069.1

(51) Int. Cl.
*B01L 3/00* (2006.01)

(52) U.S. Cl.
CPC ... *B01L 3/502715* (2013.01); *B01L 3/502707* (2013.01); *B01L 2200/025* (2013.01); *B01L 2200/027* (2013.01); *B01L 2200/04* (2013.01); *B01L 2200/10* (2013.01); *B01L 2200/12* (2013.01); *B01L 2300/161* (2013.01);
(Continued)

(58) Field of Classification Search
CPC ......... B01L 3/502715; B01L 3/502707; B01L 2200/025; B01L 2200/027; B01L 2200/04; B01L 2200/10; B01L 2200/12; B01L 2300/161; B01L 2300/168; B01L 2300/1805; B01L 2400/0406; B01L 2300/0609; B01L 2300/0636; B01L 2300/0816; B01L 2300/0851;
(Continued)

(56) References Cited

U.S. PATENT DOCUMENTS 5,498,392 A 3/1996 Wilding et al.
5,639,423 A * 6/1997 Northrup ................ B01L 7/525
422/50

(Continued)

FOREIGN PATENT DOCUMENTS

CN 105828945 A 8/2016
DE 696 26 988 T2 3/2004

(Continued)

OTHER PUBLICATIONS

International Search Report corresponding to PCT Application No. PCT/EP2019/065986, mailed Aug. 22, 2019 (German and English language document) (6 pages).

*Primary Examiner* — Liban M Hassan
(74) *Attorney, Agent, or Firm* — Maginot, Moore & Beck LLP

(57) ABSTRACT

A microfluidic device for processing chemical and/or biological substances includes a polymer cartridge and at least one other component. The other component is attached to the polymer cartridge via at least one microfluidic interface.

19 Claims, 2 Drawing Sheets

(52) U.S. Cl.
CPC . *B01L 2300/168* (2013.01); *B01L 2300/1805* (2013.01); *B01L 2400/0406* (2013.01)

(58) Field of Classification Search
CPC ....... B01L 2300/165; B01L 2300/1822; B01L 2400/0487; B01L 7/52; B01L 3/527
See application file for complete search history.

(56) References Cited

U.S. PATENT DOCUMENTS

| | | | | |
|---|---|---|---|---|
| 2005/0026181 | A1* | 2/2005 | Davis | C12Q 1/6876<br>435/6.13 |
| 2006/0040311 | A1 | 2/2006 | Thomas et al. | |
| 2007/0243634 | A1 | 10/2007 | Pamula et al. | |
| 2009/0035847 | A1* | 2/2009 | Cho | B01F 35/7547<br>435/289.1 |
| 2010/0009431 | A1 | 1/2010 | Cho et al. | |
| 2010/0077875 | A1* | 4/2010 | Moles | B01L 3/5027<br>73/864.81 |
| 2011/0229927 | A1* | 9/2011 | Larsen | C12M 41/34<br>435/287.1 |
| 2012/0329082 | A1 | 12/2012 | Viola et al. | |
| 2013/0137591 | A1 | 5/2013 | Clemens et al. | |
| 2016/0107159 | A1* | 4/2016 | Gong | B01L 3/567<br>435/6.12 |
| 2016/0289669 | A1* | 10/2016 | Fan | B01L 3/502761 |

FOREIGN PATENT DOCUMENTS

| | | | |
|---|---|---|---|
| DE | 600 14 676 | T2 | 11/2005 |
| DE | 601 26 227 | T2 | 10/2007 |
| EP | 2 894 456 | A1 | 7/2015 |

* cited by examiner

MICROFLUIDIC DEVICE, METHOD FOR PRODUCING SAME, AND USE THEREOF

This application is a 35 U.S.C. § 371 National Stage Application of PCT/EP2019/065986, filed on Jun. 18, 2019, which claims the benefit of priority to Serial No. DE 10 2018 210 069.1, filed on Jun. 21, 2018 in Germany, the disclosures of which are incorporated herein by reference in their entirety.

BACKGROUND

The present disclosure relates to a microfluidic apparatus for processing chemical and/or biological substances and to a process for producing such a microfluidic apparatus. The disclosure further relates to use of such an apparatus.

PRIOR ART

Microfluidic analysis systems, in particular so-called lab-on-a-chip devices or LOCs, allow automatic, reliable, compact and cost-effective processing of chemical or biological substances, for example for medical diagnostics. The combination of a multiplicity of operations for a specific manipulation of fluids makes it possible to realize complex, microfluidic process operations. Samples may be processed in a sealed cartridge which may be implemented as a single-use article. Various polymer materials may be used for cost-effective manufacture of such cartridges. These are generally materials having surfaces which are hydrophobic and only very slightly hydrophilic and resist wetting with aqueous solutions. To overcome the capillary forces in the channels and cavities of the microfluidic apparatus, pressures or rotational forces for example are often employed externally to allow the fluid flow to be controlled.

SUMMARY

The present disclosure provides a microfluidic apparatus provided for processing of chemical and/or biological substances. The apparatus comprises a polymer cartridge and also at least one further component, wherein the further component is connected to the polymer cartridge via at least one microfluidic interface. This embodiment of the microfluidic apparatus makes it possible to provide the apparatus with further functionalities and thus provide an apparatus which is particularly advantageously suitable for complex and preferably automated performance of processes in the apparatus. It is particularly preferable when the further component is microstructured and comprises for example different cavities and/or channels suitable for the microfluidic and/or chemical or biochemical process to be performed, for example a polymerase chain reaction (PCR) or others. Capillary forces may here be specifically utilized for processing to accomplish fluid flow. Utilization of capillary forces is suitable in particular for processing of ultralow liquid volumes (for example up to 10 μl) with a high area-to-volume ratio. Corresponding configuration of the microfluidic apparatus and the microstructuring allows the processing of the liquids to be controlled actively by externally applied forces (for example by applied pressure or rotation) or else passively by capillary forces.

In a particularly advantageous embodiment of the apparatus the further component has a higher thermal conductivity than the polymer cartridge. The further component is in particular characterized by a particularly high thermal conductivity. This allows efficient temperature controlling of liquids located in the apparatus and in particular inside the further component. Such temperature controlling, in particular heating, but also cooling, is required for various processes, especially for enzymatic processes, for example for performing a polymerase chain reaction. The further component advantageously comprises at least one heat exchange interface. A contact surface for an adjacent heating and/or cooling element for example may be provided for this purpose, thus allowing optimal heat exchange and rapid temperature controlling of liquids to take place in advantageous fashion. The further component may also comprise an optical interface, for example via transparent materials, for example for performing optical stimulations and/or evaluations of enzymatic processes.

The further component is advantageously manufactured from materials that are particularly suitable for microstructuring, for example from silicon and/or glass and/or semiconductor materials and/or metals. The further component may consist of such materials or composites of such materials partially, substantially or completely. For example silicon is particularly suitable for microstructuring, wherein the microstructuring may be performed with high precision and cost effectiveness on the basis of established processes for semiconductor technology and/or microsystem technology. This makes it possible to produce very small structure sizes that allow processing of very small liquid volumes in the μl range and below. A suitable aliquotting structure for highly parallel processing of a sample liquid may be provided for example, thus making it possible to achieve a high degree of multiplexing for molecular diagnostic tests.

In a particularly preferred embodiment the further component is configured with a predeterminable surface constitution which is adapted to the respective requirements of the processes to be performed. This surface constitution may be hydrophilic or hydrophobic, or may have hydrophilic and/or hydrophobic subregions, thus allowing especially wettability with liquids to be specifically controlled and utilized for a fluid flow. A defined surface constitution, in particular a hydrophilic constitution or a constitution which is hydrophilic in subregions and hydrophobic in other subregions, allows additional capillary forces-induced microfluidic processing of the sample liquid and such a surface constitution may therefore be utilized for effecting or facilitating capillary forces-assisted microfluidic processing of a sample liquid. This defined surface constitution is preferably specifically produced, especially if spontaneous advancing of liquids is desired at the respective positions. A defined modification of surface constitution may be carried out for example by suitable coating, deposition, oxidation or plasma treatment of the surface. A further defined modification of the surface constitution may moreover be provided; the surface constitution may especially comprise a biological and/or biochemical functionalization. For example the surfaces inside the corresponding structures may have suitable capture molecules immobilized thereupon as is known from immunological applications. Further functionalities may be achieved through interaction of distinct fluids which are in particular only sparingly miscible with one another, if at all, when for example a cavity is filled with a first fluid and subsequently overlaid with a second fluid. This allows aliquotting of the first liquid for example, wherein the first liquid remains in the respective cavity due to the capillary forces present in the microfluidic apparatus. The apparatus according to the disclosure thus altogether allows integration of components that provide a specific microfluidic functionality and/or that allow performance of specific analysis, purification or processing operations.

Suitable choice of material for the further component allows further particularly advantageous functionalities to be achieved, for example high chemical inertness, high biocompatibility, low intrinsic fluorescence, high optical transmissivity or reflectivity or a low surface roughness or combinations of such properties. This makes it possible for example to produce an optical interface between the further component of the apparatus and an external processing apparatus.

The polymer cartridge itself is in a manner known per se provided with suitable cavities and channels for the sample liquid and for any upstream liquids. The polymer cartridge may thus comprise recesses (cavities or chambers) for pre-storage of reagents or the polymer cartridge may comprise receptacles comprising liquid reagents. The polymer cartridge may further comprise cavities or chambers in which independent reactions may be performed, for example polymerase chain reactions or others.

The polymer cartridge may be manufactured from customary materials, such as for example polycarbonate (PC), polypropylene (PP), polyethylene (PE), cycloolefin copolymer (COP/COC) polymethyl methacrylate (PMMA), polydimethylsiloxane (PDMS) or thermoplastic elastomers (TPE) such as polyurethane (TPU) or styrene block copolymer (TPS). Such polymers usually exhibit rather hydrophobic or only weakly hydrophilic properties and thus disfavor spontaneous wetting. This may be a desired effect and may for example also be amplified via a coating of the polymer surface for example with Teflon, thus preventing undesired spontaneous progression of liquids (fluids) in the cartridge and allowing liquid transport only through specific perturbation/active external control, for example through the application of pressure. A further specific influencing of the surface constitution and a modification of the surface are also possible for the polymer cartridge in a manner comparable to that described above for the further component.

The polymer cartridge may for example be formed from at least two polymer layers which surround an elastic membrane disposed therebetween, i.e. are connected to one another via the elastic membrane. In this way application of pressure to the microfluidic apparatus can deflect the elastic membrane into recesses in the cartridge, for example cavities or channels, thus allowing controlled displacement of liquids out of the recesses in the polymer layers by deflection of the elastic membrane to achieve a defined processing of liquids. In one advantageous embodiment the membrane is optically absorbent and has a similar melting point to the two optionally optically transparent polymer layers. These properties of the membrane and polymer layers then allow joining of the polymer cartridge by laser transmission welding. This makes it possible to achieve simple and cost-effective manufacturability of the microfluidic apparatus.

A particular advantage of the microfluidic apparatus is that it is particularly amenable to automation. The microfluidic apparatus is advantageously provided in one or optionally more external processing units for processing. Appropriate laboratory apparatuses into which such cartridges may be inserted and for example processed for molecular diagnostic analysis may be used for this purpose.

The disclosure further comprises a process for producing such a microfluidic apparatus, wherein the at least one further component is advantageously manufactured separately from the polymer cartridge. The further component(s) may subsequently be joined to the polymer cartridge or inserted into the polymer cartridge, in particular in the course of joining the polymer cartridge. It may in particular be provided that the further component is integrated into the polymer cartridge and thus for example planarly inserted into the polymer cartridge in an appropriate recess. The further component may for example be bonded in or (merely) inserted by mechanical locking. Particular preference is given to joining of the polymer cartridge with the further component by fluid-tight bonding of the further component. The very largely independent manufacturing of the two essential components of the apparatus according to the disclosure, i.e. the polymer cartridge and the further component, allows particularly cost-effective production of the microfluidic apparatus. The polymer cartridge may for example be manufactured in cost-effective fashion from polymers such as for example polycarbonate, polypropylene, polyethylene, cycloolefin copolymer, polymethyl methacrylate and/or thermoplastic elastomers such as polyurethane or styrene block copolymers, for example by injection molding, thermoforming or stamping and joining of the polymers for example by laser transmission welding wherein tolerances resulting from manufacture may be tolerable here. By contrast, production of the further component may also employ materials having particularly advantageous properties, for example silicon, glass (for example float glass, anodically bondable glass, photostructurable glass), semiconductor materials or metals, wherein more complex production and microstructuring processes may also be employed especially for the further component. Processes suitable therefor include for example photolithography, etching processes (dry, wet-chemical, plasma-assisted), chemical gas phase deposition (CVD, such as low-pressure CVD or plasma-assisted CVD) or production of a self-assembled monolayer and further processes such as for instance laser machining (laser microstructuring, ultrashort pulse laser ablation). The structuring of the further component may particularly preferably be carried out by application of at least one photolithography masking layer. It is further preferable to employ at least one etching step or a laser structuring step for the production of the further component. The production of the further component may altogether be carried out in more complex fashion than the production of the further component, thus allowing even the smallest structure sizes in order for example to allow highly parallel processing of fluids and performance of biochemical reactions in the apparatus, for example for fully automated performance of highly multiplexed nucleic acid-based analyses in the context of diagnostic tests or others. The apparatus according to the disclosure accordingly has a particular advantage that the polymer cartridge and the further component may be characterized by different structure sizes and may be manufactured with different tolerances, thus altogether allowing cost-effective manufacture of the microfluidic apparatus with particularly specific differentiation being possible for the further component.

The further component may be manufactured from silicon for example, wherein microstructuring of the silicon may be achieved in particular by employing wafer-level structuring processes established in the semiconductor industry or microsystem technology. Wafer-level processing is advantageously followed by separation of the wafer or generally of the substrate into a multiplicity of units or chips (for example by mechanical wafer sawing or other dicing methods).

In a preferred embodiment of the production process the further component may be produced by wafer bonding. To this end it is possible for example prior to separation of microstructured wafers to produce a further wafer which is bonded to the first wafer. This makes it possible to produce particularly complex microfluidic structures by means of the further wafer which is optionally likewise microstructured. It is further possible for example to produce a wafer made of anodically bondable glass which perpendicularly to the plane of the wafer fluid-tightly seals microfluidic microchannels or microchambers introduced into a first wafer. Anodically bondable glass is particularly advantageous therefor since it is inter alia chemically inert and optically transparent. Furthermore, a sealing of the microfluidic structures introduced into silicon with a further wafer by wafer bonding may achieve a higher precision of the channel/chamber heights than would be possible in case of integration into the polymer constituents of the polymer cartridge of the microfluidic structures introduced into the further component for fluidic sealing. Sealing of the structures by wafer bonding can also substantially avoid undesired contamination of the structures that may occur for example during separation of the wafers by sawing.

The disclosure further comprises the use of the described microfluidic apparatus for processing of chemical and/or biological substances, wherein the processing is carried out preferably in automated fashion and especially in fully automated fashion. The microstructuring of the further component in particular allows even the smallest liquid volumes to be processed in fully automated fashion. The apparatus according to the disclosure is especially suitable for the processing of medical samples in the context of diagnostics. The sample may in particular be a biological or medical substance, in particular of human origin. Examples thereof include body fluids, swabs, secretions, sputum, tissue samples or apparatuses comprising bound sample material. Apparatus with bound sample material is to be understood as meaning an apparatus employed for sampling, for example an apparatus containing capture molecules or filter structures or the like in order to specifically extract constituents from an output sample. The targets to be detected in the sample are in particular of medical, clinical, therapeutic or diagnostic relevance and may be for example bacteria, viruses, particular cells, for example circulating tumor cells, cell-free DNA, proteins or other biomarkers. The apparatus according to the disclosure allows processing of even the smallest liquid volumes and thus highly parallelized analysis of the sample at very small sample volume. Automation of the process sequence ensures that no further manual steps are required (sample to result analysis) and the test may thus in principle be performed without the performing person having any special prior knowledge.

Processing of the sample in a single processing unit/in a single apparatus is particularly advantageous since this allows tests to be performed directly at the point of care in a compact apparatus without any need for complex laboratory infrastructure or a central laboratory.

To perform the tests it is advantageous when the sample is initially introduced into an appropriate cavity or sample receiving chamber of the polymer cartridge. In a second step the polymer cartridge may be inserted into the processing apparatus before the necessary interfaces (for example for transfer of mechanical forces such as pressure or rotation and/or for heating and/or cooling) between the processing apparatus and the polymer cartridge are produced. The further component may be inserted into the polymer cartridge before or in principle also after sample application. The further component is generally inserted into the polymer cartridge (for example using fluid-tight and optionally heat-resistant bonding) and in particular fluidically connected in a preceding step. The sample is then processed inside the microfluidic apparatus to provide an analysis result for example. After processing the apparatus may be removed from the processing unit and optionally disposed of. It is in principle also possible for complete processing of the sample to be carried out in a plurality of processing apparatuses (processing units) in succession.

During processing the polymer cartridge is in particular utilized for pre-storage of reagents, purification of the sample and to allow controlled pumping of liquids. The polymer cartridge further serves as packaging and as a protective case to prevent contamination of the sample by the environment and vice versa. The polymer cartridge further represents a macro-to-micro interface which allows microfluidic processing in the external processing unit. The polymer cartridge further provides a quasi-user interface which allows simple manageable introduction of the sample into the cartridge for further processing and simple introduction of the cartridge into a processing unit. Compared to conventional microfluidic apparatuses the particularly advantageous functionality of the apparatus according to the disclosure is achieved by the quasi-additional further component which features the above-described advantageous features (for example microstructuring, high thermal conductivity, improved surface constitution and/or defined modification of surface constitution).

Brief Description of the Drawings

Further features and advantages of the disclosure are apparent from the description of working examples in conjunction with the drawings. The individual features may in each case be realized alone or in combination with one another.

In the figures.

DETAILED DESCRIPTION

Figure 1:
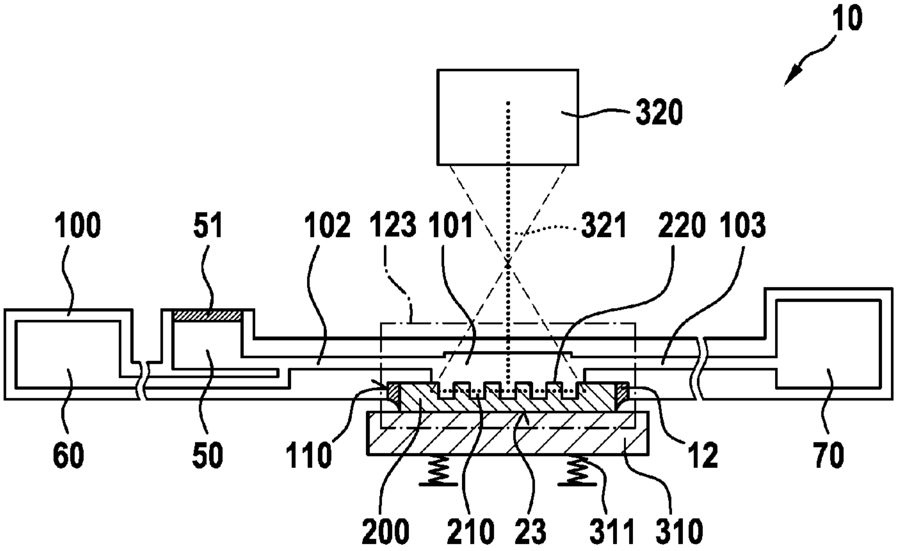
FIG. 1 shows a schematic sectional view of an apparatus according to the disclosure comprising the polymer cartridge and the further component.

FIG. 1 illustrates the essential components of an exemplary embodiment of the inventive apparatus 10 consisting of a polymer cartridge 100 and a further microfluidically connected component 200 in schematic cross section. This further component 200 is in particular a microstructured component and/or a component made of a material having a high thermal conductivity.

The cartridge 100 may be manufactured from customary polymer substrates (for example PC, PP, PE, COP/COC, PMMA, PDMS). The second component 200 may likewise be manufactured from a polymer, in particular a polymer having a coating or a treated surface (for example oxygen or nitrogen plasma treatment). Other options are glass such as plate glass, anodically bondable glass, photostructurable glass, quartz glass or other silicate glass, silicon, in particular having a chemically modified surface constitution such as (amorphous) silicon dioxide or nitride or having a coating such as a self-assembled monolayer (SAM) or related semiconductor materials such as germanium, gallium arsenide or other trivalent to pentavalent semiconductors, metal, for example gold, silver, aluminum, platinum, copper, iron, titanium or an alloy, or compounds of these materials.

The component 200 in particular has the feature that it provides an improvement to the functionality of the microfluidic apparatus since it may exhibit for example a high thermal conductivity and thus allows particularly rapid heat exchange between the environment and liquids enclosed in the cartridge. It may further have a microstructuring and a suitable surface constitution which may serve to provide an expanded microfluidic functionality based on capillary forces in particular which is brought about by the interaction of the fluids to be processed or sample constituents transported by the fluids with the microstructured surface of the component. Said component may further have a functionalized surface which can interact with molecules, in particular biomolecules or other constituents of biological species, present in the fluid to be processed.

Figure 2:
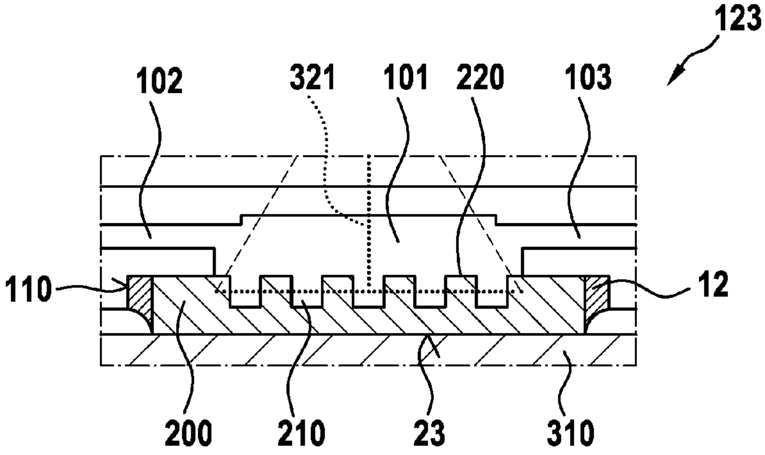
FIG. 2 shows a detailed view of a section from FIG. 1.

The polymer cartridge 100 has a chamber 50 for introduction of the sample to be analyzed. After introduction of the sample the chamber 50 may be sealed with a lid 51 to prevent contamination of the sample with the environment and vice versa. The cartridge 100 additionally comprises further reagent pre-storage chambers 60 especially for pre-storage of liquids, for example buffer solutions, PCR master mix or other liquid reagents usable for the microfluidic processing of the sample, and a chamber 70 used for receiving liquids after processing thereof inside the fluid network of the polymer cartridge 100. The polymer cartridge 100 comprises a central chamber 101 having an inlet channel 102 and an outlet channel 103 and a contact surface 110 in a recess in which the second/further component 200 is located. FIG. 2 shows an enlarged section 123 of the central region of the apparatus 10 according to the disclosure having identical reference numerals to FIG. 1. Apparent here is the special feed channel 102 to the central chamber 101 in which the contact with the further component 200 is produced. The feed channel 102 may be provided with a microfluidic throttle and/or a fluidic capacity for reducing and/or stabilizing the flow rate. The further component 200 may be fluid-tightly connected to the cartridge 100 via an adhesive join 12 at the contact surface 110. The chamber 101 and channels 102, 103 connected thereto produce a microfluidic interface between the cartridge 100 and the further component 200. In this advantageous embodiment the further component 200 thus has a direct interface with fluids enclosed in the cartridge 100. A direct interface 23 with an external processing unit, into which the polymer cartridge 100 comprising the further component 200 is inserted, is also provided. The interface 23 with the processing unit especially functions here as a thermal interface with a heating and/or cooling element 310 as part of the external processing unit.

In this embodiment the further component 200 is integrated into the polymer cartridge 100, i.e. it is surrounded by the cartridge 100 in at least two spatial dimensions. This allows a simpler implementation of the fluid-tight join 12 (for example an adhesive join) of the further component 200 to the cartridge 100 at the contact surface 110 present. Irrespective of this specific embodiment the cartridge 100 and the further component 200 are fluidically joined to one another via at least one channel/one chamber.

In this embodiment the further component 200 has microstructures 210, in particular cavities, and advantageously a modified surface constitution 220 in order for example to achieve capillary filling of the microstructures, in particular of the cavities, or to prevent undesired liquid exchange between the cavities. The cavities are in particular arranged regularly to form an array of cavities. This is advantageous since this allows for simple indexing and assignment of the cavities. For example different reagents may specifically be introduced into the cavities (for example using a piezo-dispensing capillary) and in the next step interact with a liquid introduced into the cavities (for example a sample liquid). The cavities especially have a specific surface constitution 220 which on account of the interaction with the liquid to be processed allows capillary-assisted filling of the cavities upon contacting with the liquid to be processed. The cavities in particular have a hydrophilic surface constitution at least in subregions which allows capillary-assisted filling of the cavities with aqueous solutions. These may in particular be liquids of biological, in particular human, origin such as for example a purified sample liquid or solubilized sample material or a cell suspension, a liquid comprising cell constituents (deriving from the lysis of cells), or a purified sample liquid which may in particular comprise deoxyribonucleic acid constituents or a master mix for a polymerase chain reaction.

The processing of the sample in the apparatus 10 is carried out in an external processing unit (not shown in more detail). The processing unit in particular comprises a heating and/or cooling apparatus 310 (for example a Peltier element or a resistive heating element) for heat exchange with fluids present in the apparatus 10, wherein the heating and/or cooling apparatus 310 may be planarly pressed onto the further component 200, for example using compression springs 311 to compensate for any tilting of the polymer cartridge 100 in the processing unit or the component 200 inside the polymer cartridge 100 (as a consequence of manufacturing tolerances for example). In this advantageous embodiment of the process 10 according to the disclosure the apparatus thus comprises in particular an interface 23 for efficient exchange of heat via the highly thermally conductive component 200 between fluids enclosed in the cartridge 100 and the heating and/or cooling apparatus 310 of the processing unit.

The processing unit may further contain an optics module 320, for example for fluorescence measurements. Optics module 320 may be composed of a light-sensitive electronic component such as for example a CCD array sensor or a CMOS sensor (active pixel sensor, APS), a light source such as for example a light-emitting diode (LED) or an incandescent lamp, optical color filters and further optical components such as lenses, masks, beam splitters, polarizers. The optics module thus allows imaging and detection of an optical signal 321 which derives from the liquids and substances present in the further component 200 and/or in some cases from the component 200 itself. The optics module 320 may also be utilized for homogeneous illumination and optical excitement 321 of the liquids and substances present in the component 200. The use of suitable optical excitement and detection color filters thus allows spatially-resolved measurement of the fluorescence signal at the component 200. This additionally realizes an optical interface between the component 200 and the processing unit.

Figure 3:
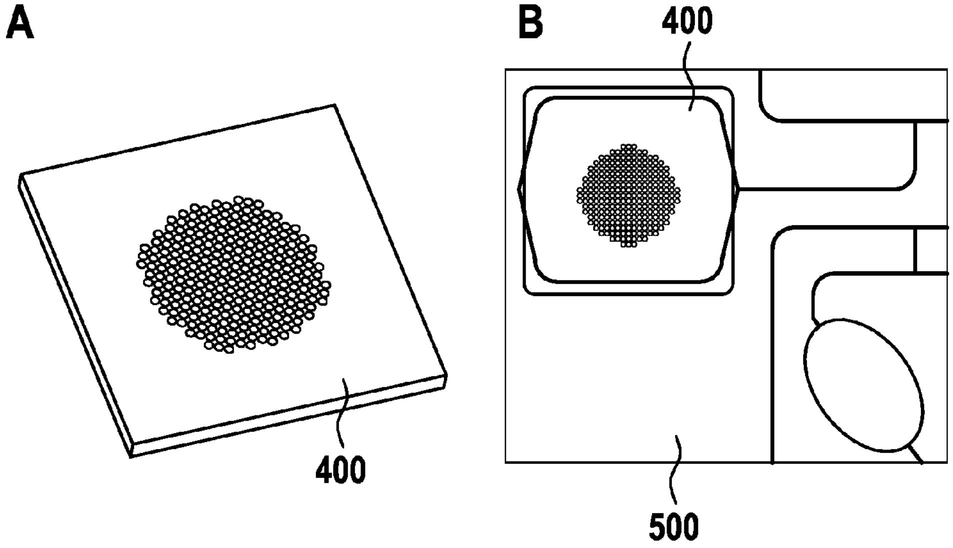
FIG. 3 shows a further component as a microstructured chip made of float glass (sub-figure A) and integration of the chip into a microfluidic polymer cartridge (sub-figure B)

FIG. 3A shows a microstructured chip 400 made of float glass having a cavity array which serves as a further component for the apparatus according to the disclosure. FIG. 3B shows the integration of the chip 400 into a microfluidic polymer cartridge 500 of a microfluidic apparatus. A microstructured Si chip having a microfluidic cavity array structure may correspondingly be integrated into a microfluidic cartridge.

Figure 4:
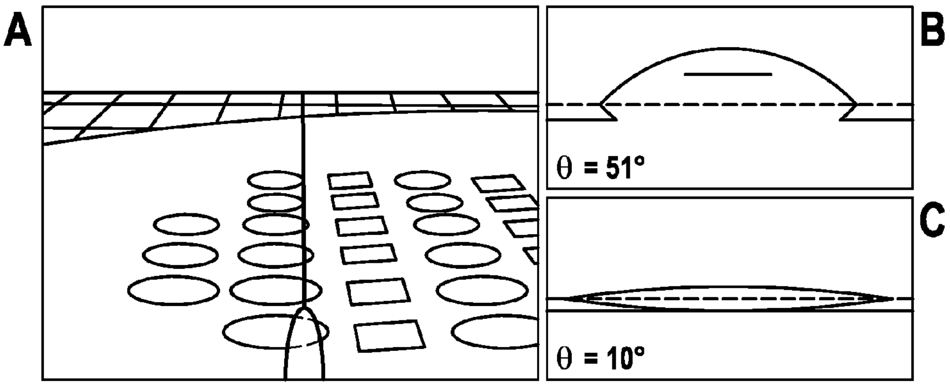
FIG. 4 shows a schematic diagram of different contact angles (sub-figures A and B) by modification of the surface constitution of a microstructured silicon wafer as a further component of the apparatus according to the disclosure.

FIGS. 4A to C illustrate a microstructured Si wafer having a modified surface constitution during a contact angle measurement. FIG. 4A is a schematic diagram of the measurement principle for a contact angle measurement for a wetted Si wafer. FIGS. 4B and 4C illustrate the different measurable contact angles (θ=51° or θ=10°) on Si wafers having different surface constitutions. The difference in the contact angle shows that different wetting characteristics are achievable according to the constitution of the surface. Such "contact angle engineering" makes it possible to produce a specific microfluidic functionality of the further component of the microfluidic apparatus according to the disclosure.

In the basic use of the microfluidic apparatus the processing of the sample liquid inside the apparatus is carried out in partially or fully automated fashion by inserting the apparatus into one or more external processing units/apparatuses. This especially has the advantage that fewer manual steps are required for processing the sample liquid. The partially or fully automated processing of the sample liquid inside the apparatus may be carried out for example by application of different pressure levels to the microfluidic apparatus via a suitable interface between the polymer cartridge and the processing unit and optionally by integration of a deflectable elastic membrane into the cartridge which allows specific displacement or aspiration of liquids. A possible alternative is for example (partial) evacuation of chambers enclosed in the apparatus and utilizing the external atmospheric pressure or use of the fictitious forces brought about by rotation of the apparatus (centrifugal, Coriolis and Euler forces) which act on the liquids inside the microfluidic apparatus. In a first step prior to processing the sample is introduced into the polymer cartridge. In a second step the cartridge is introduced or inserted into a processing unit or a processing apparatus and the necessary interfaces between the processing apparatus and the polymer cartridge and the further component, as required for processing the sample in the apparatus, are produced. Such interfaces may be used for example for transfer of mechanical forces (for instance for rotation of the apparatus and generation of centrifugal or Coriolis forces for processing the sample liquid or for breaking open and pressing out sealed reagent pre-storage receptacles), pressure (for instance for pressure-operated processing of the sample liquid, optionally using an elastic membrane which may be used to displace liquids by deflection), heat (for instance via a heating or cooling apparatus), electromagnetic radiation (for instance via an optical module for excitement and/or detection of for example fluorescence events) ultrasound (for instance for cell lysis or for degassing of liquids), exchange of magnetic forces (for instance to transport magnetic beads having a surface functionalization inside the microfluidic apparatus according to the disclosure) or electrical energy. In a third step the sample is processed inside the microfluidic apparatus. This step may comprise (a) working up the sample such as for example solubilizing or forming a suspension or dispersion, removal by filtration of constituents from the sample, lysis of pathogens present in the sample such as bacteria or viruses, extraction of DNS molecules from the sample for example using a filter or magnetic beads, pre-amplification of predetermined targets, in particular of individual predetermined base sequences via a polymerase chain reaction, (b) pumping the (worked up) sample into a central chamber and interaction of the sample with the further component, in particular with a modified surface of the further component and with any microstructures present, in particular penetration of the sample liquid into microcavities and overlaying the sample liquid present in the cavities by (c) pumping a further fluid into the central chamber, thus sealing the sample liquid penetrated into the cavities, (d) temperature-controlling the further components and in particular the sample liquid enclosed in the cavities, in particular cyclic temperature-controlling, for example to perform polymerase chain reactions in the cavities, (e) optical readout of the component, in particular detection of a fluorescence signal for analysis of the sample, in particular during the cyclic temperature-controlling, for example to perform a (quantitative) real-time polymerase chain reaction. In a fourth step the polymer cartridge is removed from the processing unit. The processing unit optionally outputs an analysis result. The processing of the sample described in the second and third step may optionally also be carried out in a plurality of processing apparatuses.

In a preferred production process of the microfluidic apparatus the polymer components for the polymer cartridge and for the further component are initially manufactured separately from one another. Production of the polymer components is preferably carried out by high-throughput processes such as injection molding or thermoforming of polymer material such as for example PC, PP, PE, COP/COC or PMMA. Manufacturing of the further components may employ, according to the predetermined functionality of the component, semifinished products such as for example silicon wafers, glass wafers or metal sheets which may then especially be microstructured. The microstructuring of silicon may especially employ wafer-level structuring processes established in the semiconductor industry and microsystem technology. Employable starting points therefor include for example Si wafers comprising native oxide, Si wafers comprising amorphous silicon dioxide and/or silicon nitride, or otherwise coated Si wafers. Microstructuring of the silicon components with cavity array structures may be effected for instance by application of a structured resist to the wafer as a mask. A resist that may be employed is for example a photoresist that has been exposed and developed. A next step then comprises isotropic or anisotropic etching of the substrate (dry, wet-chemical, plasma-assisted), in particular anisotropic etching such as deep reactive ion etching (Bosch process) to produce cavities having a high aspect ratio or wet-chemical etching, for example with hot potassium hydroxide solution, to produce pyramidal cavities, channels and chambers which, on account of the resulting slanted sidewalls (for example 54.7°), may exhibit an advantageous geometry in respect of good microfluidic fillability. The etching may be followed by a cleaning of the wafer (for example RCA cleaning, plasma cleaning) or a removal of the resist, or a further deposition may optionally be performed to modify the surface constitution and the wetting characteristics (for example a silicon dioxide surface may be produced by thermal oxidation for example or a silicon nitride surface may be produced by chemical gas phase deposition (CVD) such as low-pressure CVD (LPCVD) or plasma-assisted CVD (PECVD)). To produce a locally differing surface constitution it may especially be advantageous to remove the resist only after modification of the substrate surface, so that the resist serves as a mask for this step. Cleaning of the component (in particular to remove organic residues) may be effected using a plasma treatment (for example $O_2$ plasma) or a wet-chemical cleaning (for example with peroxomonosulfuric acid ("piranha solution")). In addition to a layer deposition it is also possible to effect specific application of solutions to the component (for example using a piezo dispensing capillary) in order after evaporation of the solvent to achieve deposition of substances previously in solution. The substances applied or dried onto the surface of the further component in this way (for example polyethylene glycol (PEG), xanthan gum, trehalose, agarose or mixtures thereof) may likewise be rendered useful for an advantageous modification of the wetting characteristics. In particular a drying of such suitable substances into cavities previously introduced into the substrate for example in some cases makes it possible to achieve better microfluidic fillability of the cavities.

A microstructuring of the further component may also be carried out by other types of structuring processes such as for example material machining with a laser (for example for float glass). This may employ different types of laser systems (ultrashort pulse laser) according to the employed substrate material such as a metal, glass or semiconductor in order for example to achieve the highest possible material removal during structuring. Furthermore, the structuring of a glass component may also be effected by wet-chemical etching, for example with hydrofluoric acid, for example using a photostructurable glass such as Foturan, or by a photolithographic process. For production of a composite component composed of glass and silicon, anodically bondable glass may especially be used.

After manufacturing of the further component this may be joined to the polymer cartridge/to one or more polymer components forming the polymer cartridge. The join may be produced via an adhesive bond. This may be a silicone adhesive or suitable epoxy adhesive for example which is especially suitable for the possible different thermal expansion and surface constitution of the further component and the polymer cartridge. The cartridge component comprising the contact surface with the component may optionally comprise centering tabs to fix the position of the further component. High-throughput manufacturing may employ for example a positioning and dispensing robot which inserts the further component into the cartridge component and then places an adhesive bead around the further component. Use of an adhesive having suitable wetting characteristics ensures that both the further component and the cartridge component are wetted with the adhesive, thus achieving a reliable fluid-tight adhesive bond. It is in particular preferable when only the side walls of the further component are wetted but not the underside, this then being able to function as a thermal interface. It is moreover especially possible to employ a light-curable adhesive to achieve particularly rapid adhesive bonding and thus a high throughput during manufacturing. As an alternative the further component may also merely be inserted into a polymer component of the polymer cartridge, especially such that upon joining the polymer components to the polymer cartridge a fixing of the further component inside the polymer cartridge is produced.

The joining of the individual polymer components to afford the polymer cartridge may be carried out for example by laser transmission welding with a thermoplastic elastomer (TPE) such as polyurethane (TPU) or styrene block copolymer (TPS) in particular using welding masks to achieve a high throughput during manufacturing, or by adhesive bonding of the polymer components.

After the joining of the further component with the polymer cartridge/the complete joining of the cartridge with the integrated further component the microfluidic apparatus may be airtightly packaged, especially at reduced pressure or in a chemically inert protective atmosphere. This prevents an undesired termination, i.e. a physical or chemical alteration of the surface of the microfluidic apparatus by constituents of the atmosphere upon storage, especially in the case of the further component having a modified surface constitution.

The following list elucidates exemplary measurements for the microfluidic apparatus:

Thickness of the polymer substrates: 0.1 mm to 10 mm, preferably 1 mm to 3 mm

Channel cross-sections: $10\times10$ μm² to $3\times3$ mm², preferably $100\times100$ μm² to $1\times1$ mm²

Chamber dimensions: $1\times1\times0.1$ mm³ to $100\times100\times10$ mm³, preferably $3\times3\times0.3$ mm³ to $30\times30\times3$ mm³

Lateral dimensions of an entire system: $10\times10$ mm² to $200\times200$ mm², preferably $30\times30$ mm² to $100\times100$ mm²

Thickness of the substrate of the further component: 10 μm to 10 mm, preferably 100 μm to 3 mm lateral extent of the further component: $0.1\times0.1$ mm² to $50\times50$ mm², preferably $1\times1$ mm² to $20\times20$ mm²

In the case of a cavity array chip for a (spectrally multiplex) digital polymerase chain reaction a specification of the further component may for example be realized as follows:

Number of cavities: 100 to 1 000 000, preferably 1000 to 100 000

Volume of a cavity: 1 pl to 1 μL, preferably 10 pl to 100 nl

Diameter of a cavity: 5 μm to 200 μm, preferably 30 μm to 100 μm

One exemplary specification of the further component for the case of a cavity array chip for a (geometrically multiplex) quantitative polymerase chain reaction may for example be realized as follows:

Number of cavities: 2 to 1000, preferably 10 to 200

Volume of a cavity: 10 pl to 10 μL, preferably 100 pl to 1 μL

Diameter of a cavity: 30 μm to 1000 μm, preferably 100 μm to 500 μm.

The invention claimed is:

1. A microfluidic apparatus for processing of chemical and/or biological substances, comprising:

a polymer cartridge comprising:

a first chamber configured to receive a sample introduced into the microfluidic apparatus;

(i) a plurality of recesses configured to pre-store reagents and/or ii a plurality of receptacles comprising liquid reagents;

a second chamber fluidly connected downstream of the first chamber; and an outlet channel arranged downstream of the second chamber and configured to receive liquids after processing; and at least one further component connected to the polymer cartridge via at least one microfluidic interface, wherein the at least one further component:

is microstructured with a plurality of cavities that open into the second chamber, has a higher thermal conductivity than the polymer cartridge, has at least one heat exchange interface configured to temperature control of liquid in the at least one further component, and is integrated into the polymer cartridge via a fluid-tight connection such that the polymer cartridge surrounds the at least one further component in at least two spatial dimensions.

2. The apparatus as claimed in claim 1, wherein the at least one further component comprises at least one optical interface.

3. The apparatus as claimed in claim 1, wherein the at least one further component comprises one or more of silicon, glass, semiconductor materials, and metals.

4. The apparatus as claimed in claim 1, wherein the at least one further component has a predeterminable surface constitution, and wherein the surface constitution is hydrophilic or hydrophobic or has one or more of hydrophilic subregions and hydrophobic subregions.

5. The apparatus as claimed in claim 4, wherein the surface constitution comprises one or more of a biological functionalization and a biochemical functionalization.

6. A microfluidic system comprising:

the microfluidic apparatus as claimed in claim 1; and an external processing unit configured to process the substances.

7. A process for producing the microfluidic apparatus as claimed in claim 1, the process comprising:

manufacturing the at least one further component separately from the polymer cartridge of the microfluidic apparatus.

8. The process as claimed in claim 7, further comprising:

applying at least one photolithographic masking layer during manufacturing of the at least one further component.

9. A method of using the microfluidic apparatus as claimed in claim 1, the method comprising:

processing one or more chemical substances and biological substances with the microfluidic apparatus.

10. The method as claimed in claim 9, wherein the processing is automated.

11. The method as claimed in claim 9, wherein the apparatus is used for analyses in medical diagnostics.

12. The apparatus as claimed in claim 1, wherein the heat exchange interface is configured as a contact surface that contacts an adjacent heating and/or cooling element.

13. The apparatus as claimed in claim 1, the at least one further component consisting essentially of one or more of silicon, glass, semiconductor materials, and metals.

14. The apparatus as claimed in claim 1, the at least one further component consisting essentially of silicon.

15. The apparatus as claimed in claim 1, wherein the plurality of cavities form an aliquoting structure.

16. The apparatus as claimed in claim 15, wherein the plurality of cavities are configured such that one cavity of the plurality of cavities receives a first fluid and is overlaid with a second fluid such that the plurality of cavities enables parallel processing of a sample liquid.

17. The apparatus as claimed in claim 1, wherein the microfluidic apparatus is configured to carry out a polymerase chain reaction.

18. The apparatus as claimed in claim 1, wherein:

the polymer cartridge further comprises at least two polymer layers and an elastic membrane disposed between the at least two polymer layers, the at least two polymer layers surrounding the elastic membrane and/or are connected to one another by the elastic membrane, and the polymer cartridge is configured such that application of pressure to the microfluidic apparatus deflects the elastic membrane into the recesses in the polymer cartridge so as to enable controlled displacement of liquids from the recesses and processing of liquids in the polymer cartridge.

19. The apparatus as claimed in claim 1, further comprising:

a third chamber arranged downstream of the outlet channel and configured to receive the liquids after processing.

* * * * *